US010824231B1

(12) United States Patent
DeSalvo et al.

(10) Patent No.: US 10,824,231 B1
(45) Date of Patent: Nov. 3, 2020

(54) APPARATUSES, SYSTEMS, AND METHODS FOR MODULATING FLUID FLOW WITHIN A FLUIDIC DEVICE

(71) Applicant: Facebook Technologies, LLC, Menlo Park, CA (US)

(72) Inventors: Riccardo DeSalvo, Pasadena, CA (US); Matthew Schwab, Pasadena, CA (US); Joseph Tien, Menlo Park, CA (US); Alex Guadalupe Zaragoza, Los Angeles, CA (US)

(73) Assignee: Facebook Technoloiges, LLC, Menlo Park, CA (US)

( * ) Notice: Subject to any disclaimer, the term of this patent is extended or adjusted under 35 U.S.C. 154(b) by 0 days.

(21) Appl. No.: 16/006,888

(22) Filed: Jun. 13, 2018

(51) Int. Cl.
  *G06F 3/01* (2006.01)
  *F16K 31/126* (2006.01)
(52) U.S. Cl.
  CPC .............. *G06F 3/014* (2013.01); *G06F 3/016* (2013.01)
(58) Field of Classification Search
  CPC ........ G06F 3/014; G06F 3/016; F16K 31/126; F16K 31/365; F16K 7/12; F16K 7/17; F16K 7/07
  See application file for complete search history.

(56) References Cited

U.S. PATENT DOCUMENTS 3,039,733 A * 6/1962 Mattioli .................... F16K 7/07
  251/5
4,877,053 A * 10/1989 Yusko, Jr. ............... F16K 7/061
  137/556

FOREIGN PATENT DOCUMENTS

DE     19508129 A1 * 9/1996 ....... A61B 17/12009
WO  WO-2009015986 A1 * 2/2009 ............... B65B 3/30

* cited by examiner

*Primary Examiner* — Marina A Tietjen
(74) *Attorney, Agent, or Firm* — FisherBroyles, LLP

(57) ABSTRACT

The disclosed fluidic device may include (1) a channel configured to transport fluid from a source to a drain and (2) a gate configured to modulate fluid flow through the channel. The gate may modulate fluid flow by bending a gate actuation membrane that alternates between an initial configuration that does not interfere with a cross section of the channel and a bent configuration that causes the cross section to reversibly compress. The gate actuation membrane may include an undulation that facilitates the bending of the gate actuation membrane.

20 Claims, 8 Drawing Sheets

APPARATUSES, SYSTEMS, AND METHODS FOR MODULATING FLUID FLOW WITHIN A FLUIDIC DEVICE

BACKGROUND

Augmented reality and virtual reality systems may use wearable devices (such as a haptic glove) to give users the perception that they are interacting with virtual objects. To make such wearable devices simpler, more effective, and/or less bulky, some artificial reality systems may use a system of fluidic devices within their wearable devices. The instant disclosure identifies and addresses a need for improved apparatuses, systems, and methods for modulating fluid flow within such fluidic devices (e.g., fluidic devices that operate within artificial reality systems).

SUMMARY

As will be described in greater detail below, the instant disclosure describes various apparatuses, systems, and methods for modulating fluid flow within a fluidic device. In one example, a fluidic device may include (1) a channel configured to transport fluid from a source to a drain and (2) a gate configured to modulate fluid flow through the channel. In one example, the gate may modulate fluid flow by bending a gate actuation membrane that alternates between an initial configuration that does not interfere with a cross section of the channel and a bent configuration that causes the cross section of the channel to reversibly compress. In this example, the gate actuation membrane may include an undulation that facilitates the bending of the gate actuation membrane.

In some embodiments, the gate may include at least one chamber with an adjustable volume that expands with fluid pressure within the chamber. The chamber may be defined by multiple membranes, including the gate actuation membrane, which may define the bottom of the chamber. In these embodiments, a low pressure state of the chamber may correspond to a first chamber size in which the gate actuation membrane rests in the initial configuration, and a high pressure state of the gate may correspond to a second chamber size, which may be larger than the first chamber size and which may displace the gate actuation membrane, toward the channel, into the bent configuration such that the gate actuation membrane causes the cross section of the channel to compress.

In some examples, the gate actuation membrane in the bent configuration may cause the cross section to compress by pressing on at least one of the channel or a component of the fluidic device that abuts the channel. In one such example, the component that abuts the channel may represent a force concentrator. The force concentrator may include a force reception surface that abuts the gate actuation membrane and a force concentration surface that is smaller than the force reception surface and that abuts the channel.

In one embodiment, the undulation of the membrane may add extra length to the gate actuation membrane. This extra length may allow the gate actuation membrane to bend without straining the material that forms the gate actuation membrane more than a threshold amount.

In some examples, the fluid flow in the channel may include a first fluid flow when the gate actuation membrane is in the initial configuration and a second fluid flow when the gate actuation bends into the bent configuration. In one example, the gate may modulate fluid flow by modulating a rate of fluid flow through the channel. Additionally or alternatively, the gate may modulate fluid flow by modulating a volume of fluid passing through the channel. The fluid in the fluidic device may include (without limitation) a liquid and/or a gas.

In one example, the gate further includes an inferior gate actuation chamber positioned beneath the gate actuation chamber. The inferior gate actuation chamber may include an inferior gate actuation membrane. In this example, the channel may be positioned between the gate actuation membrane and the inferior gate actuation membrane and the gate actuation chamber may be connected to the inferior gate actuation chamber using a connecting structure that is positioned along an outer portion of the channel.

In one embodiment, the connecting structure may include (1) a superior connecting membrane with a medial end that is coupled to the outer portion of the gate actuation chamber and a lateral end that is coupled to a superior end of a vertical connecting membrane that runs perpendicular to the superior connecting membrane, (2) the vertical connecting membrane, and (3) an inferior connecting membrane with a medial end that is coupled to the outer portion of the inferior actuation chamber and a lateral end that is coupled to an inferior end of the vertical connecting membrane. In this embodiment, (1) the connection point between the lateral end of the superior connecting membrane and the superior end of the vertical connecting membrane may form a first right angle and (2) the connection point between the lateral end of the inferior connecting membrane and the inferior end of the vertical connecting membrane may form a second right angle.

In another embodiment, the connecting structure may include (1) a superior connecting membrane with a medial end that is coupled to the outer portion of the gate actuation chamber and a lateral end that is coupled to a lateral end of an inferior connecting membrane and (2) the inferior connecting membrane with a medial end that is coupled to the outer portion of the inferior actuation chamber and the lateral end, which is coupled to the lateral end of the superior connecting membrane. In this embodiment, the connection point between the lateral end of the superior connecting membrane and the lateral end of the inferior connecting membrane may form an acute angle.

In addition, a corresponding haptic device may include one or more fluidic devices with at least one of the features discussed above. In some examples, the haptic device may further include an actuator, a controller, and one or more sensors. In these examples, at least one of the actuator, the controller, or the one or more sensors may be composed of a group of fluidic devices that includes the at least one fluidic device. In one embodiment, the group of fluidic devices may be coupled together to form a composite fluidic device.

In some examples, the haptic device may represent a haptic glove configured to operate within a virtual reality system. In one such example, the virtual reality system may include a head-mounted display, an imaging device, and the haptic device. The virtual reality system may also include a console machine coupled to the head-mounted display, the imaging device, and the haptic device. In this example, the haptic device may be configured to (1) send action requests, initiated by a user wearing the haptic glove, to the console machine and (2) provide haptic feedback, based on a haptic feedback signal received from the console machine, to the user as the user interacts with virtual objects in the virtual reality system.

In addition, a corresponding method may include (1) forming an undulation in a gate actuation membrane and (2)

coupling the undulated gate actuation membrane to a gate configured to modulate fluid flow in a channel (e.g., by bending the undulated gate actuation membrane such that the undulated gate actuation membrane may alternate between an initial configuration that does not interfere with a cross section of the channel and a bent configuration that causes the cross section to reversibly compress), and (3) positioning the gate within a fluidic device such that the undulated gate actuation membrane causes a channel of the fluidic device to be compressed when the undulated gate actuation membrane adopts the bent configuration.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
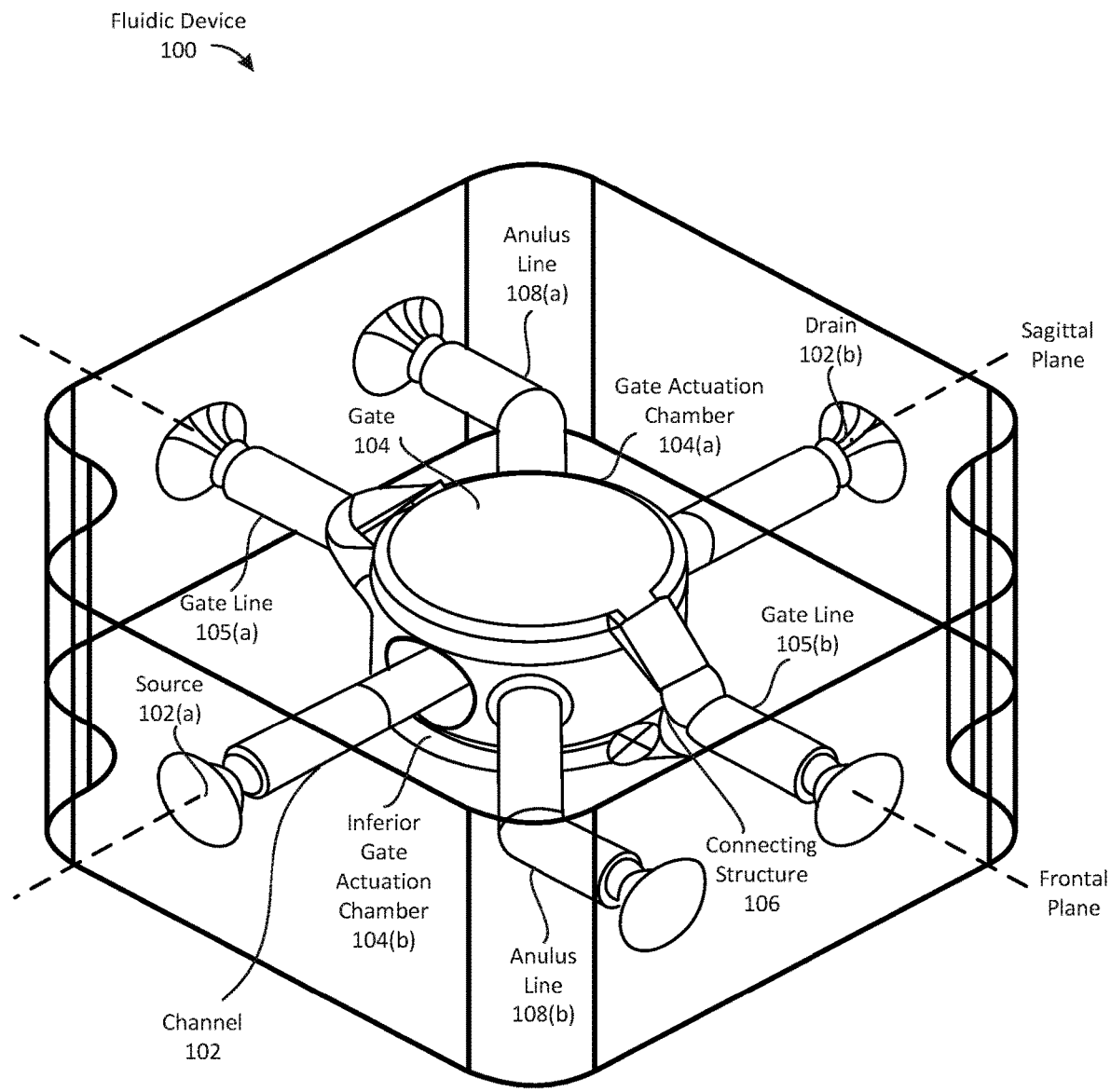
FIG. 1 is a perspective view of an exemplary fluidic device with an undulated gate actuation membrane, in accordance with an embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for modulating fluid flow within fluidic devices. As will be explained in greater detail below, embodiments of the instant disclosure may include a fluidic device, which may be used in a haptic device operating within an artificial reality system. The fluidic device may include (1) a conductive channel that transports fluid from a source to a drain and (2) a gate configured to modulate fluid flow in the channel by bending into a configuration that causes the cross-section to reversibly compress. The gate may bend by bending a bottom surface (i.e., a gate actuation membrane) of a chamber within the gate. The bottom surface may bend when the chamber expands (e.g., in response to pressure increasing in the chamber). When the bottom surface is bent, the bottom surface may either press on the channel or press on a component adjacent to the channel, causing the cross-section of the channel to compress.

In one example, a portion of the bottom surface may be undulated. For example, the bottom surface may curl or loop. The undulation (e.g., an s-shaped hinge) may provide extra length to the bottom surface. The extra length may provide extra movement, allowing the bottom surface to bend without stretching the material from which the bottom surface is formed. By allowing the bottom surface to bend without stretching, the disclosed systems and methods may reduce the amount of energy and time required to bend the bottom surface.

The following will provide, with reference to FIGS. 1-3 and 6-7, detailed descriptions of exemplary fluidic devices with an undulated gate actuation membrane and haptic devices configured with such fluidic devices. The discussion corresponding to FIG. 4 will provide detailed descriptions of an exemplary gate actuation membrane that does not include an undulation. The discussion corresponding to FIG. 5 will provide detailed descriptions of an artificial reality environment in which the exemplary fluidic devices and/or haptic devices may operate. In addition, the discussion corresponding to FIG. 8 will provide an exemplary method for forming a fluidic device with an undulated gate actuation membrane.

Figure 3A:
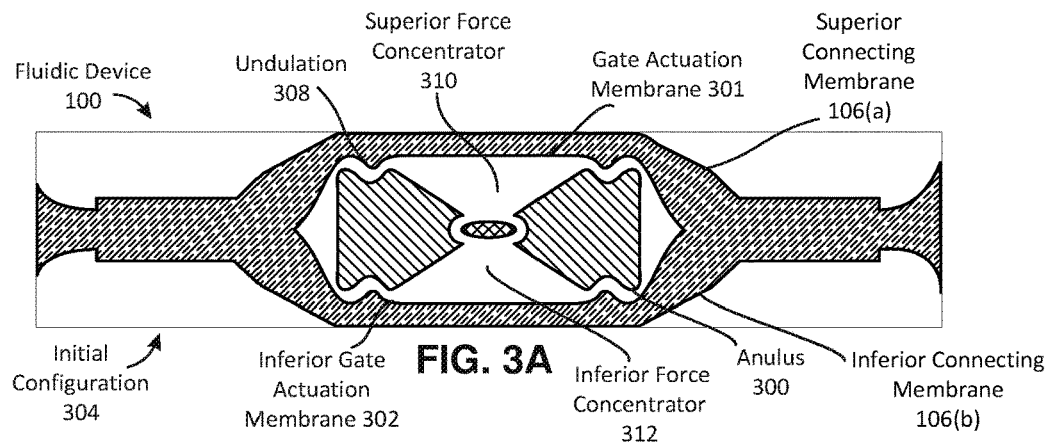
FIG. 3A is cross-sectional view of the exemplary fluidic device illustrated in FIG. 1, as viewed from a frontal plane, when a gate actuation membrane of the exemplary fluidic device is in an initial configuration.
Figure 3B:
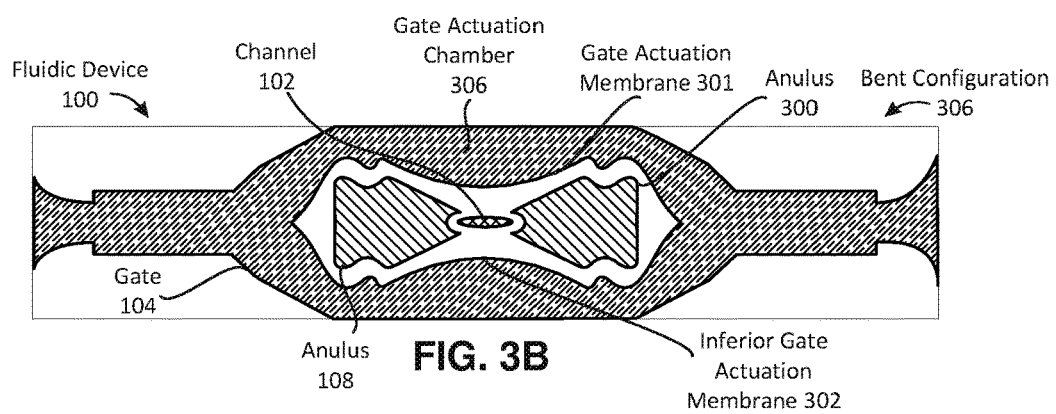
FIG. 3B is a cross-sectional view of the exemplary fluidic device illustrated in FIG. 1, as viewed from a frontal plane, when a gate actuation membrane of the exemplary fluidic device is in a bent configuration.

FIG. 1 illustrates a perspective view of an exemplary fluidic device 100. Fluidic device 100 generally represents any type or form of fluid handling device that controls fluid flow in a channel from a source to a drain. Examples of fluidic device 100 include, without limitation, a fluidic pump and/or a latch gate. Cross-sectional views of fluidic device 100 are illustrated in FIGS. 3A-3B, which show a cross-sectional view of fluidic device 100 from a frontal plane, and FIG. 3C, which shows a cross-sectional view of fluidic device 100 from a sagittal plane. In some examples, a rate and/or volume of fluid flowing through fluidic device 100 may be variable. In these examples, fluidic device 100 may alternate between an open state, in which fluid is flowing through the channel, and a closed state, in which fluid is not flowing through the channel and/or is flowing below a threshold amount.

In some embodiments, fluidic device 100 may be interconnected with other fluidic devices to form a composite fluidic device. In some examples, the composite fluidic device may function analogous to an electronic device (e.g., that includes and/or operates as a fluidic field effect transistor, a fluidic diode, a fluidic resistor, a fluidic capacitor, etc.). In one such example, fluidic device 100 may function as a fluidic logic device (e.g., an inverter, OR gate, etc.) in tandem with other fluidic logic devices, forming a fluidic circuit in which fluid flow in one fluidic logic device controls the fluid flow of other fluidic logic devices.

In examples in which a composite fluidic device functions as an electronic device, the functionality of the composite fluidic device may depend on the combination and ordering of fluidic logic devices used within the composite fluidic device. For example, just as an electronic transistor may be built using a combination of different electric logic gates in a predetermined order, a fluidic transistor may be built using a combination of different fluidic logic gates in a predetermined order.

In some examples, multiple fluidic circuits may be combined in a form of large scale integration (LSI). In one such example, a fluidic LSI may be used as a haptic assembly in a wearable device (e.g., in an artificial reality system). In these examples, composite fluidic devices may operate as part of a variety of haptic components within the haptic assembly, such as a controller, an actuator, and/or a sensor, as will be described in greater detail below in connection with FIGS. 5-7.

As shown in FIG. 1 (and in FIGS. 3A-3C), fluidic device 100 may include (1) a channel 102, (2) a gate 104 configured to modulate fluid flow through channel 102, and—in some embodiments—(3) an anulus, which may cause a force concentrator to actuate downward to compress channel 102. The anulus is not shown in FIG. 1, but may be connected to anulus lines 108(a) and 108(b) illustrated in FIG. 1 and is illustrated as anulus 300 in FIGS. 2A-2B. Each of these elements are also illustrated from a frontal view in FIGS. 3A-3B and 3D and a sagittal view in FIG. 3C. In FIGS. 3A-3D, channel 102 is shaded using cross-hatch lines, gate 104 is shaded using lines that slope upward, and anulus 300 is shaded using lines that slope downward (the unshaded portions may represent an elastic material). Each of these elements (i.e., channel 102, gate 104, and anulus 300) will be discussed in turn.

First, channel 102 generally represents any type or form of conduit (i.e., a conduction channel) configured to transport fluid from a source 102(a) to a drain 102(b). Source 102(a) may serve as an input for fluid to enter channel 102 and drain 102(b) may serve as an output for fluid to exit channel 102. In one example, channel 102 may be configured to transport fluid in the form of a liquid. In an additional or alternative example, channel 102 may be configured to transport fluid in the form of a gas. In some examples, channel 102 may represent a microchannel (e.g., measuring a millimeter or less in diameter). In one embodiment, channel 102 may be made of a compressible material. In this embodiment, a rate and/or volume of fluid flowing through channel 102 may depend on the degree to which channel 102 is compressed.

Next, gate 104 generally represents any type or form of assembly configured to modulate fluid flow through a channel in a fluidic device (e.g., by modulating a rate and/or volume of fluid flowing through the channel). As shown in FIG. 1, gate 104 may include a gate actuation chamber 104(a), positioned above channel 102, and an inferior gate actuation chamber 104(b), positioned below channel 102, which may connect to a gate line 105(a) and a gate line 105(b). The two gate actuation chambers may be connected to one another using a connecting structure. The bottom of gate actuation chamber 104(a) may be defined by a gate actuation membrane (not shown in FIG. 1 but shown as gate actuation membrane 301 in FIG. 3). Similarly, the bottom of inferior gate actuation chamber 104(b) may be defined by a gate actuation membrane (shown as inferior gate actuation membrane 302 in FIG. 3).

In one example, as shown in FIGS. 1 and 3A-3B, the connecting structure (illustrated as connecting structure 106) may include two membranes: a superior connecting membrane 106(a) and an inferior connecting membrane 106(b). The medial end of superior connecting membrane 106(a) may connect to an outer portion of gate actuation chamber 104(a) and the medial end of inferior connecting membrane 106(b) may connect to an outer portion of inferior gate actuation chamber 104(b), as illustrated in FIGS. 1 and 3A. The lateral ends of both connecting structures may connect to one another, such that the connection point between the two lateral ends forms an acute angle, as shown in FIG. 3A. The acute angle may facilitate a bending motion (which will be described in greater detail below) by gate actuation membrane 301 and/or by inferior gate actuation membrane 302.

Figure 2:
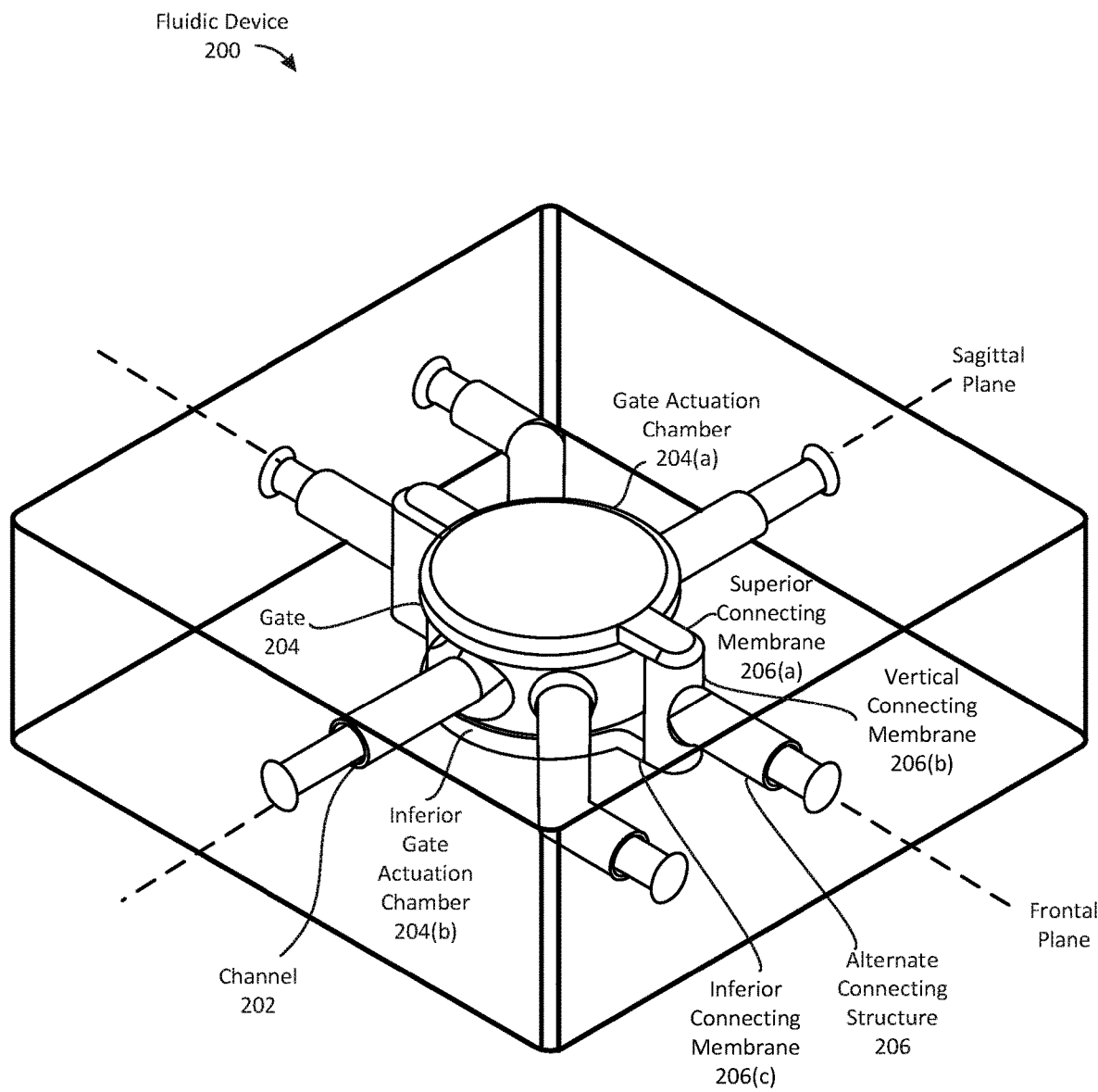
FIG. 2 is a perspective view of an exemplary fluidic device with an undulated gate actuation membrane, in accordance with an additional embodiment.
Figure 3C:
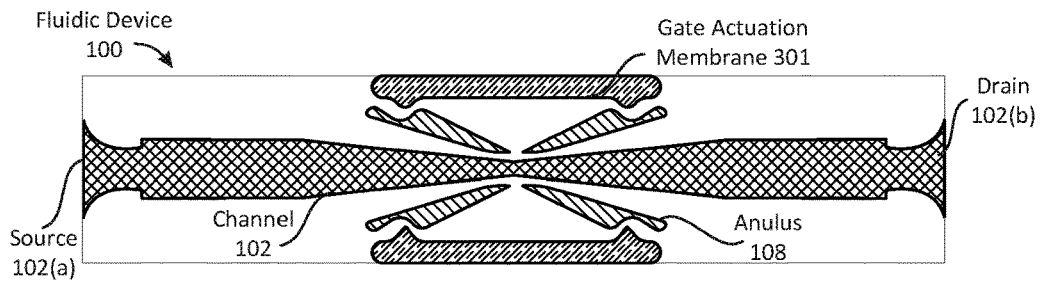
FIG. 3C is a cross-sectional view of the exemplary fluidic device illustrated in FIGS. 1 and 2, as viewed from a sagittal plane.
Figure 3D:
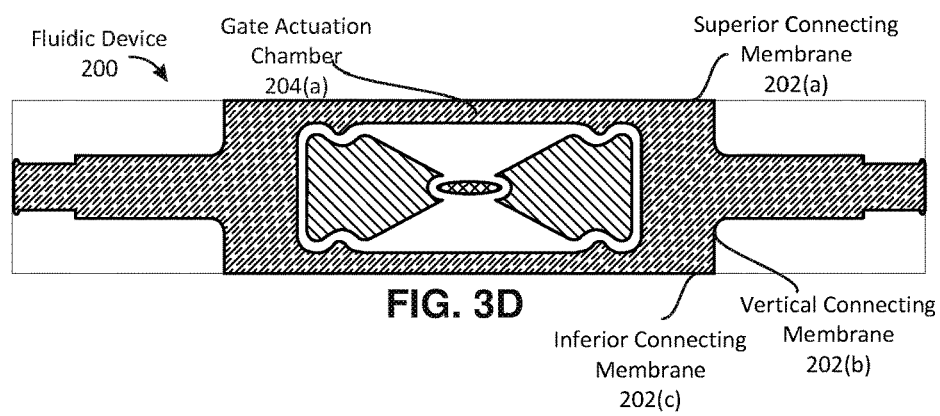
FIG. 3D is a cross-sectional view of the exemplary fluidic device illustrated in FIG. 2, as viewed from a frontal plane.

In an alternate example, the connecting structure may include three membranes that connect to form two right angles, as illustrated in FIGS. 2 and 3D. FIGS. 2 and 3D illustrate an alternate embodiment of a fluidic device (i.e., fluidic device 200) in which a channel 202, a gate 204, a gate actuation chamber 204(a), an inferior gate actuation chamber 204(b), and an anulus (not shown) each exhibit one or more of the elements and/or characteristics described in connection with fluidic device 100. However, an alternate connecting structure 206 may include three membranes: (1) a superior connecting membrane 206(a), (2) a vertical connecting membrane 206(b) that runs perpendicular to superior connecting membrane 206(a), and (3) an inferior connecting membrane 206(c) that runs parallel to superior connecting membrane 206(a).

As shown in FIGS. 2 and 3D, the medial end of superior connecting membrane 206(a) may be coupled to an outer portion of gate actuation chamber 204(a) and the medial end of inferior connecting membrane 206(a) may be coupled to an outer portion of inferior gate actuation chamber 204(b). The superior end of vertical connecting membrane 206(b) may be coupled to the lateral end of superior connecting membrane 206(a) and the inferior end of vertical connecting membrane 206(b) may be coupled to a lateral end of inferior connecting membrane 206(c). In this example, the connection point between the lateral end of superior connecting membrane 206(a) and the superior end of vertical connecting membrane 206(b) may form a first right angle. The connection point between the lateral end of inferior connecting membrane 206(c) and the inferior end of vertical connecting membrane 206(b) may form a second right angle.

Returning to FIG. 1, gate 104 may modulate fluid flow through channel 102 in a variety of ways. In one example, gate 104 may cause channel 102 to reversibly compress, causing fluid flow to alternate between a first fluid flow when the channel is uncompressed and a second fluid flow when the channel is compressed.

In one embodiment, gate 104 may cause channel 102 to reversibly compress by bending gate actuation membrane 301, as illustrated in FIGS. 3A-3B. In this embodiment, gate actuation membrane 301 may alternate between an initial configuration 304, illustrated in FIG. 3A, that does not interfere with a cross section of channel 102, and a bent configuration 306, illustrated in FIG. 3B, that causes the cross section to reversibly compress.

In some examples, gate actuation membrane 301 may include an undulation (e.g., undulation 308 in FIG. 3A) that facilitates the bending of gate actuation membrane 301. The term undulation, as used herein, generally refers to any type or form of shape formed in a portion of a membrane that reduces stretching or facilitates more efficient actuation of the membrane. Examples of undulated shapes include, without limitation, a wave-shape, a u-shape, a v-shape, a w-shape, an s-shape, etc. In one example, undulation 308 may create a dimple in gate actuation membrane 301 and/or may have the appearance and/or functionality of a hinge. In some examples, undulation 308 may be formed from a same material as the rest of gate actuation membrane 301. In other examples, undulation 308 and the rest of gate actuation membrane 301 may be formed from different materials (e.g., the material from which undulation 308 is formed may have greater flexibility than the material from which the rest of gate actuation membrane 301 is formed).

Figure 4A:
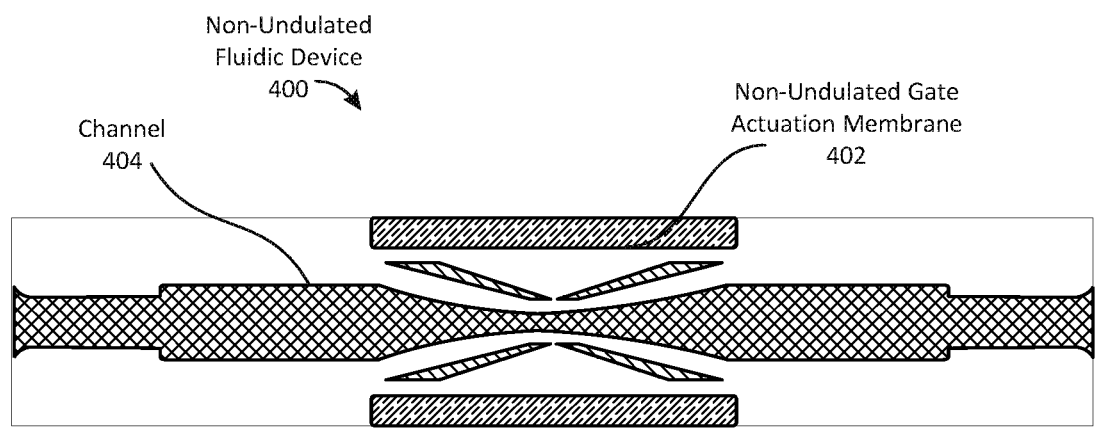
FIG. 4A is a cross-sectional view of a fluidic device that does not include an undulated gate actuation membrane, as viewed from a sagittal plane.
Figure 4B:
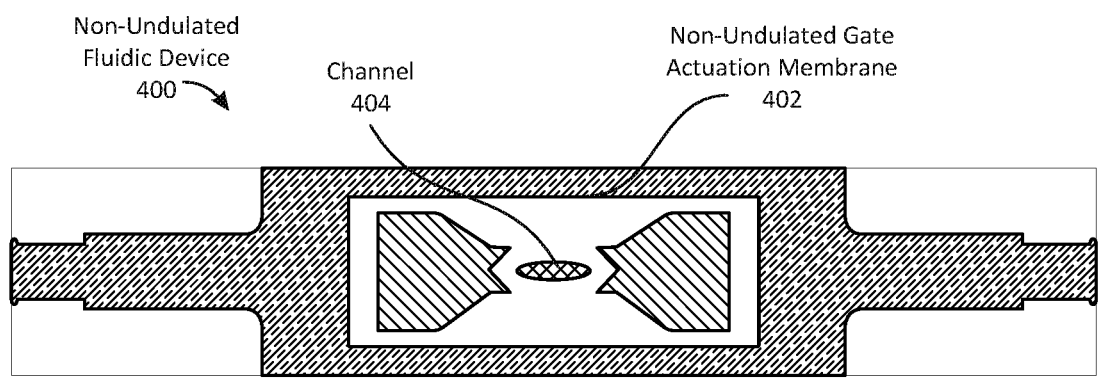
FIG. 4B is a cross-sectional view of the fluidic device illustrated in FIG. 4A, as viewed from a frontal plane.

In some embodiments, undulation 308 may add extra length to gate actuation membrane 301. The extra length may allow gate actuation membrane 301 to bend without stretching the material that forms gate actuation membrane 301 more than a threshold amount. In gate actuation membranes that do not include an undulation, by contrast, the material of the gate actuation membrane may stretch in order to bend. As an example, FIGS. 4A-4B illustrate two cross-sectionals of a non-undulated fluidic device 400 (from a frontal plane in FIG. 4A and a sagittal plane in FIG. 4B). Non-undulated fluidic device 400 includes a non-undulated gate actuation membrane 402. In this example, non-undulated gate actuation membrane 402 may also bend to cause a channel 404 to compress. However, without the extra length provided by an undulation, the material that forms non-undulated gate actuation membrane 402 may stretch to allow non-undulated gate actuation membrane 402 to bend.

Returning to FIG. 1, gate actuation membrane 301 may bend in response to a variety of events. For example, gate actuation membrane 301 may bend in response to an increase in fluid pressure applied to gate actuation membrane 301. In this example, gate actuation chamber 104(a) may be configured with an adjustable volume. The volume in gate actuation chamber 104(a) may expand with fluid pressure (e.g., as a result of fluid flowing from gate line 105(a) to gate line 105(b)). In this example, a low pressure state of gate actuation chamber 104(a) may correspond to a first chamber size (e.g., in which gate actuation membrane 301 rests in initial configuration 304, as illustrated in FIG. 3A). A high pressure state of gate actuation chamber 104(a) may correspond to a second chamber size, which may be larger than the first chamber size (as illustrated in FIG. 3B). The expansion of gate actuation chamber 104(a) into the second chamber size may displace gate actuation chamber 104(a), toward channel 102, into bent configuration 306 such that gate actuation membrane 301 causes the cross section of channel 102 to compress. In some embodiments, the term "low pressure" generally refers to a pressure of a fluid that falls below a designated pressure level and the term "high pressure" generally refers to a pressure of a fluid that falls above the designated pressure level.

In one embodiment, initial configuration 304 may cause channel 102 to adopt an open state and bent configuration 306 may cause channel 102 to transition to a closed state. In some embodiments, an "open" state generally refers to a state in which fluid within channel 102 is flowing from source 102(a) to drain 102(b) at or above a designated flow rate. In contrast, a "closed" state may generally refer to a state in which fluid within channel 102 is flowing below the designated flow rate.

In one example, gate actuation membrane 301 may, in its bent configuration, press directly on channel 102, causing channel 102 to compress. In another example, gate actuation membrane 301 may, in its bent configuration, press on a component of fluidic device 100 that abuts channel 102, such as a force concentrator and/or anulus 300.

For discussion purposes, this disclosure has focused on embodiments in which gate actuation membrane 301 alternates between an initial and bent configuration. However, in additional or alternative embodiments, inferior gate actuation membrane 302 may alternate between an initial and bent configuration in response to the same events and/or causing the same results.

Finally, anulus 300 generally represents any type or form of collapsible chamber that may cause (e.g., by collapsing) a force concentrator (such as superior force concentrator 310 and/or inferior force concentrator 312 illustrated in FIGS. 3A-3C) to actuate downward or upward toward channel 102. In one embodiment, anulus 300 may represent a fluid-filled chamber and may collapse when fluid is ejected from the chamber. In some examples, anulus 300 may collapse when gate actuation membrane 301 adopts bent configuration 306, which may in turn cause superior force concentrator 310 to actuate downward and/or inferior force concentrator 312 to actuate upward. By actuating downward or upward, superior force concentrator 310 and/or inferior force concentrator 312 may reversibly press on channel 102 to cause channel 102 to compress (e.g., as shown in FIGS. 3A-3D). In some embodiments, superior force concentrator 310 and/or inferior force concentrator 312 may each include two parallel surfaces: (1) a force reception surface that abuts gate actuation membrane 301 and (2) a force concentration surface that abuts channel 102. The force concentration surface may be smaller than the force reception surface. In one example, the entire surface of the force concentration surface may be smaller than the force reception surface. In another example, the force concentration surface may include a conical and/or pyramidical structure with a tip that is smaller than the force reception surface. Due to the smaller size of the force concentration surface, gate actuation membrane 301 and/or anulus 300 may apply pressure to the larger force reception surface when gate actuation membrane 301 is in bent configuration 306 illustrated in FIG. 3B. This may cause superior force concentrator 310 and/or inferior force concentrator 312 to move toward channel 102 and press on channel 102, applying the concentrated force of the smaller force concentration surface to channel 102.

Fluidic device 100 (e.g., operating as part of a fluidic circuit) may be used to accomplish a variety of functionalities. In one example, fluidic device 100 may be used in a haptic device in an artificial reality system, in place of an electronic device. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality.

Figure 5:
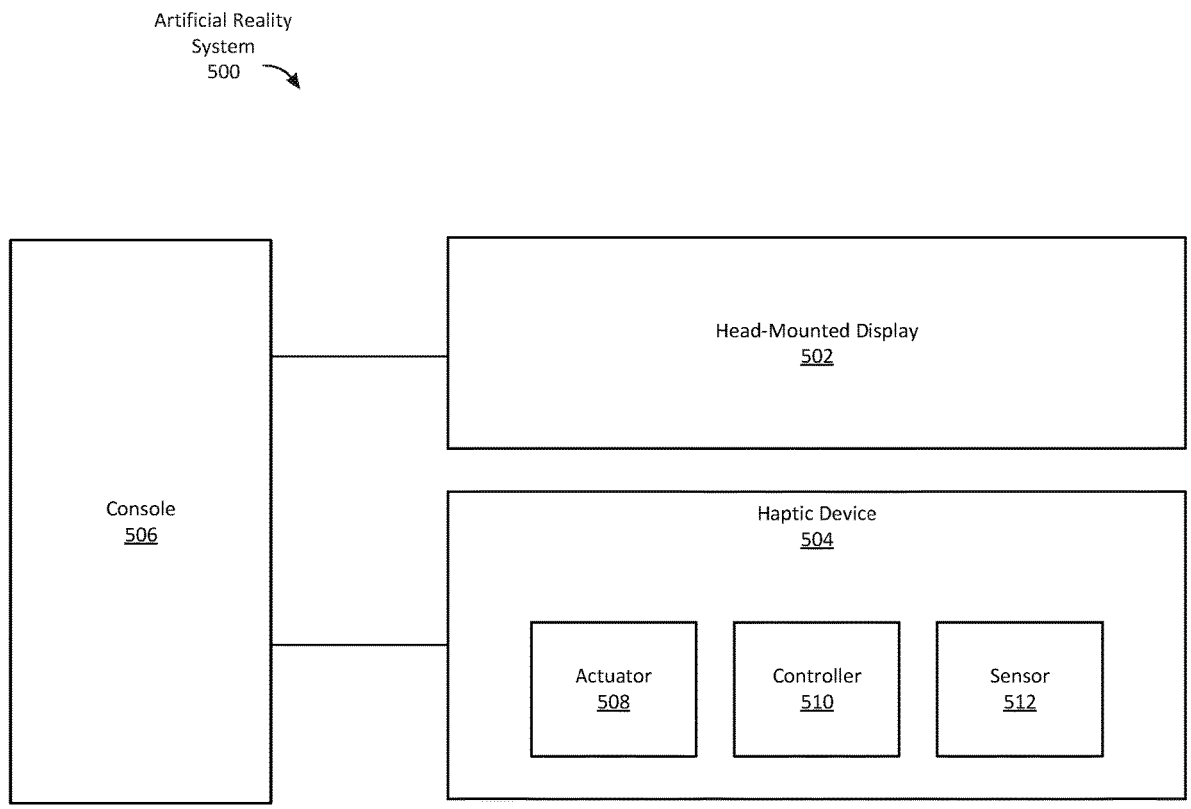
FIG. 5 is a block diagram of an exemplary artificial reality system that includes one or more fluidic devices.
Figure 6:
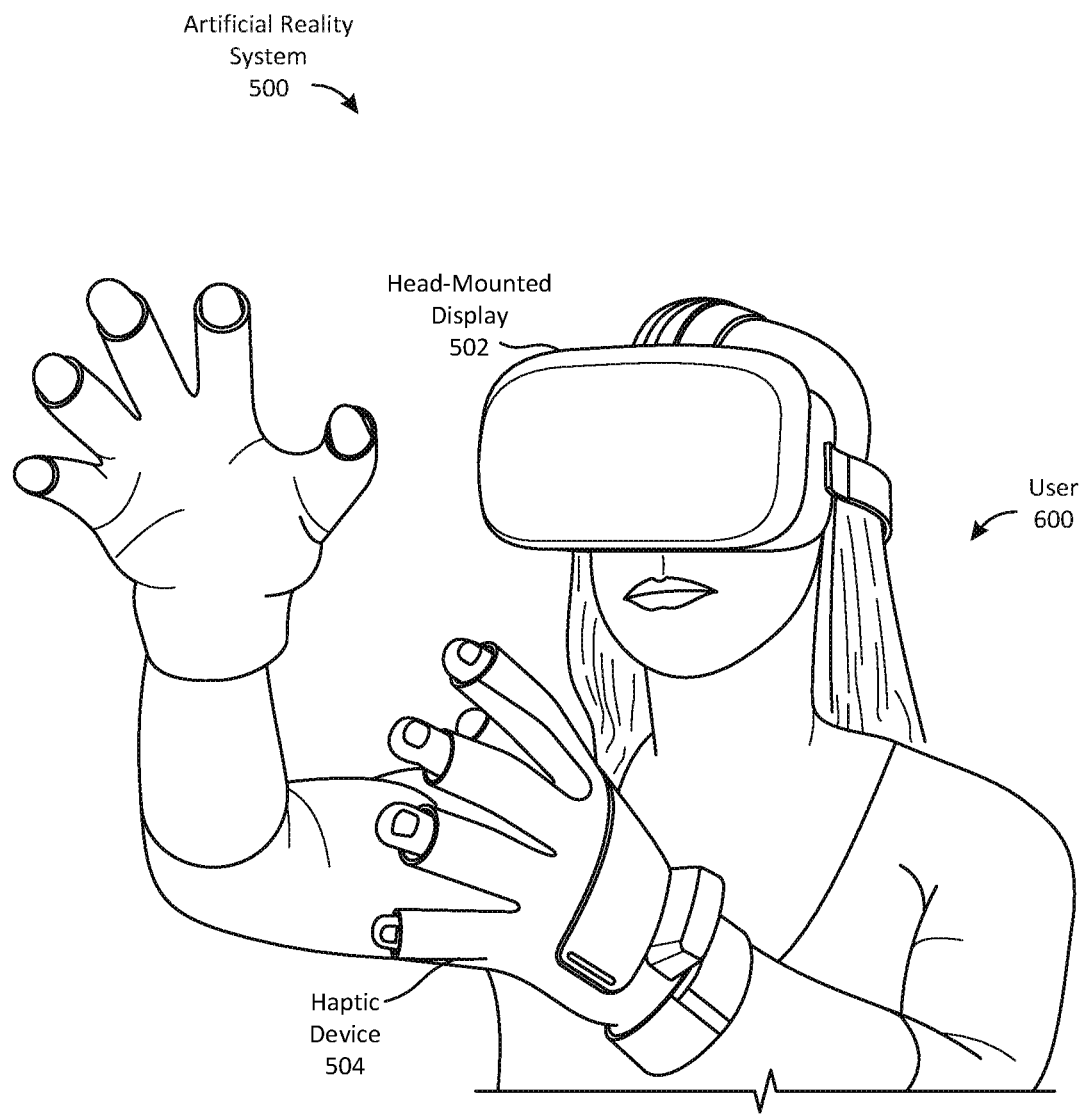
FIG. 6 is a perspective view of a user wearing an exemplary head-mounted display and an exemplary haptic glove within an artificial reality system, such as the exemplary artificial reality system depicted in FIG. 5.

FIG. 5 is a block diagram of an exemplary artificial reality system 500 that includes a head-mounted display 502 and a haptic device 504, each of which may be coupled to a console 506. In this example, a user may wear head-mounted display 502 around his or her head and/or may wear haptic device 504 (e.g., as a glove on one or both hands), as illustrated in FIG. 6. FIG. 6 is a perspective drawing of an exemplary embodiment of artificial reality system 500 in which a user 600 is wearing an exemplary embodiment of head-mounted display 502 and haptic device 504.

While FIG. 5 shows an example artificial reality system including one head-mounted display and one haptic assembly, and FIG. 6 shows an example artificial reality environment including one head-mounted display and two haptic devices, in other embodiments any number of these components may be included in an artificial reality system. For example, in some embodiments there may be multiple head-mounted displays each having an associated haptic device, with each head-mounted display and each haptic device communicating with the same console.

Head-mounted display 502 generally represents any type or form of assembly configured to present media representing an artificial reality to a user wearing the assembly. Examples of media presented by head-mounted display 502 include, without limitation, one or more images, video, and/or audio. In one example, audio may be presented via an external device (e.g., speakers and/or headphones) that receives audio information from head-mounted display 502 and/or console 506 and presents audio data via the external device based on the audio information.

In some embodiments, head-mounted display 502 may represent a virtual reality headset. In these embodiments, head-mounted display 502 may present views (e.g., images, video, sound, etc.) of a computer-generated reality. Additionally or alternatively, head-mounted display 502 may represent an augmented reality (AR) and/or mixed reality (MR) headset. In these embodiments, head-mounted display 502 augments views of a physical, real-world environment with computer-generated elements (e.g., images, video, sound, etc.).

Haptic device 504 generally represents any type or form of wearable device, worn by a user within an artificial reality system, that provides haptic feedback to the user to give the user the perception that he or she is physically engaging with a virtual object. In some embodiments, haptic device 504 may provide haptic feedback by applying a vibration, motion, and/or force to the user. For example, haptic device 504 may limit or augment a user's movement. To give a specific example, haptic device 504 may limit a user's hand from moving forward so that the user has the perception that his or her hand has come in physical contact with a virtual wall. In this specific example, one or more actuators within the haptic advice may achieve the physical movement restriction by pumping fluid into an inflatable bladder of the haptic device. In some examples, a user may also use haptic device 504 to send action requests to console 506. Examples of action requests include, without limitation, requests to start an application and/or end the application and/or requests to perform a particular action within the application.

In some embodiments, haptic device 504 may include a combination of various coupled fluidic devices (i.e., a composite fluidic device as described above in connection with FIG. 1). In one example, a circuitry within haptic device 504 may consist exclusively of fluidic devices. Alternatively, the circuitry within haptic device 504 may include a combination of fluidic devices and electrical devices, forming a combined fluidic/non-fluidic haptic device. The composite fluidic devices may be used to perform a variety of actions. For example, a composite fluidic device may operate as a controller 510 (e.g., addressing actuators included in haptic device 504 according to a haptic feedback signal from console 506). In another example, a composite fluidic device may act as a sensor 512 and/or as an actuator 508 within haptic device 504.

Figure 7:
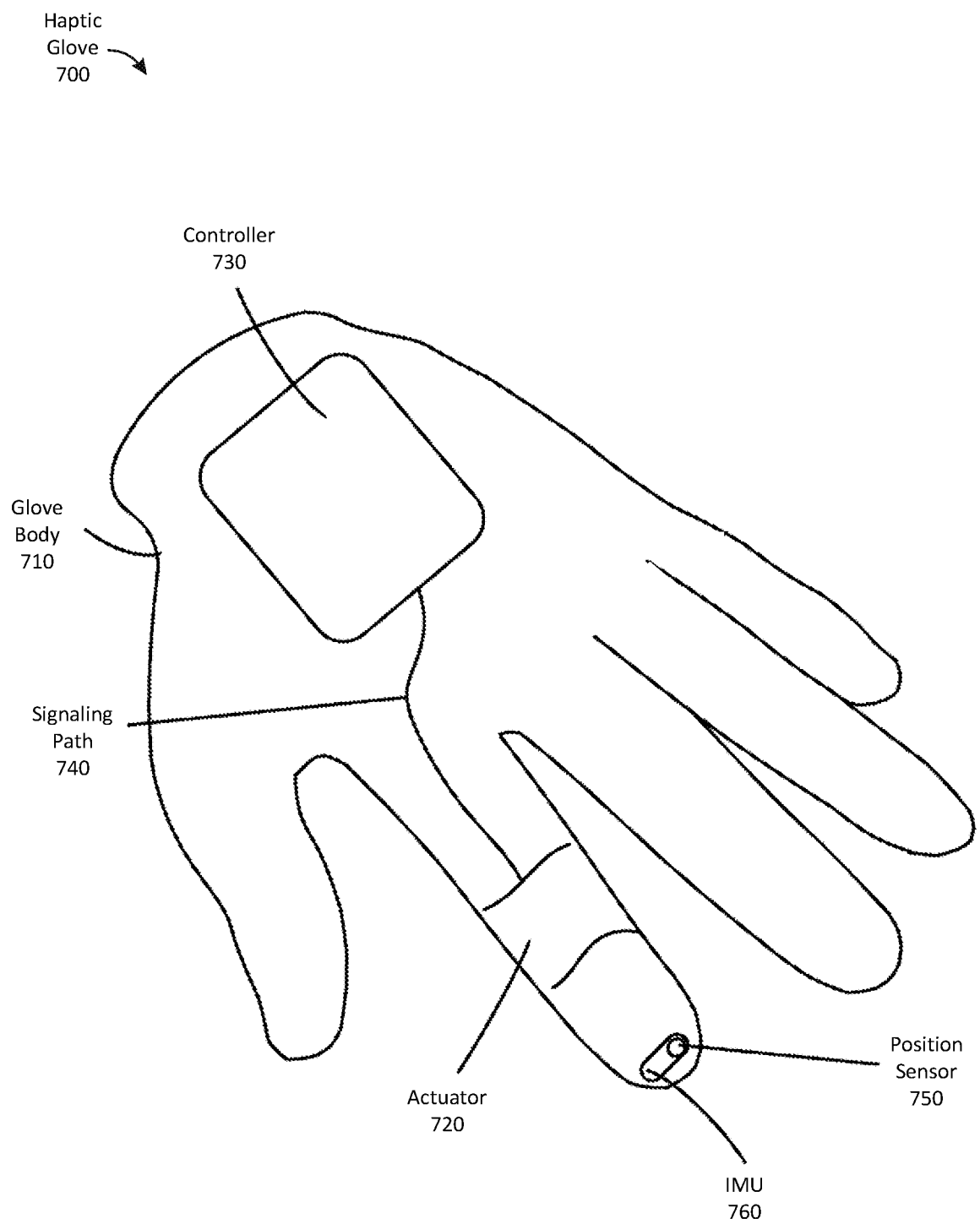
FIG. 7 is a perspective view of the exemplary haptic glove depicted in FIG. 5.

To give a specific simplified example of a fluidic circuitry operating within a haptic device, FIG. 7 illustrates an exemplary haptic glove 700 with an assembly of interconnected fluidic devices configured to perform a variety of tasks. As shown in FIG. 7, haptic glove 700 may be formed by a glove body 710. In some examples, glove body 710 may represent a garment and may be coupled to an assembly of haptic components such as an actuator 720, a controller 730, a signaling path 740, a group of position sensors (including position sensor 750), and/or one or more inertial measurement units (IMU) (including IMU 760).

In some embodiments, one or more of these haptic components may be placed beneath an outer surface of glove body 710, shielded from view. Additionally or alternatively, one or more of the haptic components may be placed on an outer surface of glove body 710, such that the haptic components are visually detectable. In one example, position sensor 750 may be coupled to a portion of glove body 710 corresponding to a fingertip, as shown in FIG. 7. In this embodiment, (1) actuator 720 may be coupled to a portion of glove body 710 corresponding to a finger joint, (2) controller 730 may be coupled to a portion of glove body 710 corresponding to a dorsal side of a hand, and (3) signaling path 740 may be coupled between controller 730 and actuator 720, as shown in FIG. 7.

In one example, the haptic assembly in FIG. 7 may be configured to collect location and/or motion data describing a physical position and/or movement of haptic glove 700. In this example, position sensor 750 may generate measurement signals in response to motion of haptic glove 700. Position sensor 750 may, in some embodiments, represent an accelerometer and/or a gyroscope that has at least one fluidic component. After generating the measurement signals, position sensor 750 may transmit the measurement signals to IMU 760. Then, IMU 760 may rapidly sample the measurement signals (e.g., from position sensor 750 and other position sensors within haptic glove 700) and calculate the estimated position of haptic glove 700 from the sampled measurements or transmit the sampled measurements to the console for the console to calculate the estimated position of haptic glove 700. In this example, position sensor 750 and/or IMU 760 may be composed, at least in part, of one or more fluidic devices (including, e.g., fluidic device 100).

In another example, the haptic assembly in FIG. 7 may be configured to instruct haptic glove 700 to perform specific functions (e.g., based on instructions received from a console such as console 506 in FIG. 5). In this embodiment, controller 730 may receive instructions (e.g., via a haptic feedback signal) from console 506 and actuate haptic glove 700 according to the instructions via one or more actuators (such as actuator 720). For example, controller 730 may instruct actuator 720 (e.g., via signaling path 740) to pump fluid into an inflatable bladder to achieve a physical movement restriction. In this example, controller 730 and/or actuator 720 may be composed, at least in part, of a group of composable fluidic devices (including, e.g., fluidic device 100).

Figure 8:
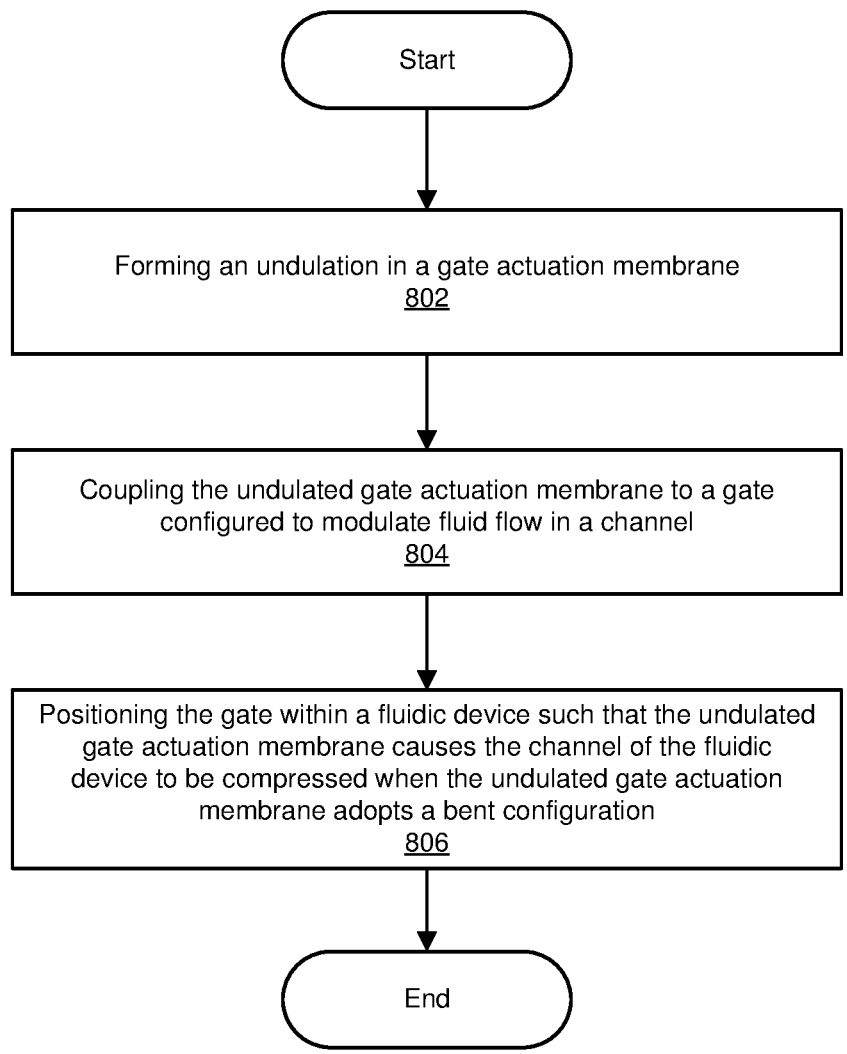
FIG. 8 is a flow diagram of an exemplary method for forming an undulation in a gate actuation membrane, such as the gate actuation membrane illustrated in FIGS. 1 and 2.

FIG. 8 is a flow diagram of an exemplary method 800 for forming a fluidic device with one or more of the characteristics described above in connection with FIGS. 1-7. As shown in FIG. 8, at step 802, the method may include forming an undulation in a gate actuation membrane. For example, undulation 308 may be formed in gate actuation membrane 301, as shown in FIGS. 3A-3D. The undulation may add extra length to the undulated gate actuation membrane, making it easier for the gate actuation membrane to bend (e.g., without straining the material that forms the undulated gate actuation membrane or by only straining the material a trivial amount).

Next, at step 804, the method may include coupling the undulated gate actuation membrane to a gate, such as gate 104 shown in FIG. 1, configured to modulate fluid flow in a channel, such as channel 102 shown in FIG. 1. Finally, at step 806, the method may include positioning the gate within a fluidic device, such as fluidic device 100 shown in FIG. 1, such that the undulated gate actuation membrane causes the channel of the fluidic device to be compressed when the undulated gate actuation membrane adopts a bent configuration, such as bent configuration 306 shown in FIG. 3B.

As discussed throughout the instant disclosure, the disclosed systems, methods, and devices may provide a fluidistor with a gate controlled via actuation of a gate-actuation membrane. In some embodiments, the membrane may include an s-shaped hinge (e.g., an undulation) that increases the total length of the gate actuation membrane. Without the s-shaped hinge, the material of the gate actuation membrane would need to stretch in order to apply pressure to a feed tube (i.e., in order to reach the feed tube or a component adjacent to the feed tube). However, with the extra length afforded the gate actuation membrane via the s-shaped hinge, the gate actuation membrane may reach the feed tube (or adjacent component) without the material stretching, leading to greater efficiency and a faster response time.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A fluidic device comprising:
 a channel configured to transport fluid from a source to a drain; and
 a gate configured to modulate fluid flow through the channel, wherein:
  the gate modulates fluid flow by bending a gate actuation membrane that alternates between an initial configuration that does not interfere with a cross section of the channel and a bent configuration that causes the cross section to reversibly compress; and
  the gate actuation membrane comprises an undulation, present in both the initial configuration and the bent configuration, that facilitates the bending of the gate actuation membrane.

2. The fluidic device of claim 1, wherein:
 the gate comprises at least one chamber with an adjustable volume that expands with fluid pressure within the chamber;
 the chamber is defined by a plurality of membranes including the gate actuation membrane, which defines a bottom of the chamber;

a low pressure state of the chamber corresponds to a first chamber size in which the gate actuation membrane rests in the initial configuration; and a high pressure state of the gate corresponds to a second chamber size, which is larger than the first chamber size, which displaces the gate actuation membrane, toward the channel, into the bent configuration such that the gate actuation membrane causes the cross section of the channel to compress.

3. The fluidic device of claim 1, wherein the gate actuation membrane in the bent configuration causes the cross section to compress by pressing on at least one of the channel or a component of the fluidic device that abuts the channel.

4. The fluidic device of claim 3, wherein:

the component that abuts the channel comprises a force concentrator with a force reception surface that abuts the gate actuation membrane and a force concentration surface that is smaller than the force reception surface and that abuts the channel; and the force concentration surface is configured to reversibly press on the channel in response to the gate actuation membrane in the bent configuration pressing on the force reception surface.

5. The fluidic device of claim 1, wherein:

the undulation adds extra length to the gate actuation membrane; and the extra length of the undulation allows the gate actuation membrane to bend without straining a material that forms the gate actuation membrane more than a threshold amount.

6. The fluidic device of claim 1, wherein the fluid flow in the channel comprises a first fluid flow when the gate actuation membrane is in the initial configuration and a second fluid flow when the gate actuation membrane bends into the bent configuration.

7. The fluidic device of claim 1, wherein the gate modulates fluid flow by modulating at least one of:

a rate of fluid flow through the channel; or a volume of fluid passing through the channel.

8. The fluidic device of claim 1, wherein the fluid comprises at least one of:

a liquid; or a gas.

9. The fluidic device of claim 1, wherein:

the gate further comprises a gate actuation chamber, comprising the gate actuation membrane, and an inferior gate actuation chamber, comprising an inferior gate actuation membrane;

the channel is positioned between the gate actuation membrane and the inferior gate actuation membrane; and the gate actuation chamber is connected to the inferior gate actuation chamber using a connecting structure that is positioned along an outer portion of the channel.

10. The fluidic device of claim 9, wherein:

the connecting structure comprises:

a superior connecting membrane with a medial end that is coupled to an outer portion of the gate actuation chamber and a lateral end that is coupled to a superior end of a vertical connecting membrane that runs perpendicular to the superior connecting membrane;

the vertical connecting membrane; and an inferior connecting membrane with a medial end that is coupled to an outer portion of the inferior gate actuation chamber and a lateral end that is coupled to an inferior end of the vertical connecting membrane;

a connection point between the lateral end of the superior connecting membrane and the superior end of the vertical connecting membrane form a first right angle; and a connection point between the lateral end of the inferior connecting membrane and the inferior end of the vertical connecting membrane form a second right angle.

11. The fluidic device of claim 9, wherein:

the connecting structure comprises:

a superior connecting membrane with a medial end that is coupled to the outer portion of the gate actuation chamber and a lateral end that is coupled to a lateral end of an inferior connecting membrane; and the inferior connecting membrane with a medial end that is coupled to the outer portion of the inferior gate actuation chamber and the lateral end, which is coupled to the lateral end of the superior connecting membrane; and a connection point between the lateral end of the superior connecting membrane and the lateral end of the inferior connecting membrane form an acute angle.

12. The fluidic device of claim 1, wherein the undulation comprises a shape formed in a portion of the gate actuation membrane.

13. The fluidic device of claim 12, wherein the shape comprises at least one of:

a wave-shape;

a u-shape;

a v-shape;

a w-shape; or an s-shape.

14. The fluidic device of claim 12, wherein the shape comprises at least one of:

a curl;

a hinge-shape; or a loop.

15. The fluidic device of claim 12, wherein the undulation comprises a dimple.

16. The fluidic device of claim 12, wherein the undulation is formed from a same material as the rest of the gate actuation membrane.

17. The fluidic device of claim 12, wherein the undulation is formed from a different material than the material used to form the rest of the gate actuation membrane.

18. The fluidic device of claim 17, wherein the different material comprises a material with greater flexibility than the flexibility of the material used to form the rest of the gate actuation membrane.

19. A method comprising:

forming an undulation in a gate actuation membrane;

coupling the undulated gate actuation membrane to a gate configured to modulate fluid flow in a channel, wherein:

the channel is configured to transport fluid from a source, configured to act as an input for fluid to enter the channel, to a drain, configured to act as an output for fluid to exit the channel; and the gate is configured to modulate fluid flow by bending the undulated gate actuation membrane such that the undulated gate actuation membrane may alternate between an initial configuration that does not interfere with a cross section of the channel and a bent configuration that causes the cross section to reversibly compress, wherein the undulation is formed such that the undulation is present in the gate actuation membrane in both the initial configuration and the bent configuration; and positioning the gate within a fluidic device such that the undulated gate actuation membrane causes the channel of the fluidic device to be compressed when the undulated gate actuation membrane adopts the bent configuration.

20. The method of claim 19, wherein:

the undulation adds extra length to the undulated gate actuation membrane; and the extra length of the undulation allows the undulated gate actuation membrane to bend without straining a material that forms the undulated gate actuation membrane more than a threshold amount.

* * * * *